(12) United States Patent
Lin

(10) Patent No.: US 7,299,479 B2
(45) Date of Patent: Nov. 20, 2007

(54) OPTICAL RECORDING AND/OR REPRODUCING DEVICE WITH A BUFFER MEMBER

(75) Inventor: Chih-Cheng Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 393 days.

(21) Appl. No.: 10/883,843

(22) Filed: Jul. 6, 2004

(65) Prior Publication Data

US 2005/0028175 A1   Feb. 3, 2005

(30) Foreign Application Priority Data

Jul. 29, 2003   (TW) .............................. 92120647 A

(51) Int. Cl.
  *G11B 33/02*  (2006.01)
  *G11B 17/04*  (2006.01)
  *G11B 17/03*  (2006.01)
  *G11B 33/14*  (2006.01)
(52) U.S. Cl. ...................................... 720/601; 720/648
(58) Field of Classification Search ................ 720/601, 720/648
  See application file for complete search history.

(56) References Cited

U.S. PATENT DOCUMENTS

| 4,533,966 | A  | * | 8/1985  | Kume ........................ 360/96.5 |
| 4,607,301 | A  | * | 8/1986  | Iizuka ......................... 360/93 |
| 6,094,323 | A  | * | 7/2000  | Tong ........................ 360/97.02 |
| 6,246,654 | B1 | * | 6/2001  | Omori et al. ................ 720/604 |
| 6,411,583 | B1 | * | 6/2002  | Yamamoto et al. ......... 720/647 |
| 6,426,932 | B2 | * | 7/2002  | Omori et al. ................ 720/648 |
| 6,650,609 | B2 | * | 11/2003 | Omori et al. ................ 720/649 |
| 6,971,111 | B2 | * | 11/2005 | Chuang et al. ............. 720/601 |
| 7,069,563 | B2 | * | 6/2006  | Huang et al. ............... 720/601 |

FOREIGN PATENT DOCUMENTS

JP   2001-236775 A   8/2001

* cited by examiner

*Primary Examiner*—Angel Castro
*Assistant Examiner*—Christopher R. Magee
(74) *Attorney, Agent, or Firm*—Birch, Stewart, Kolasch & Birch, LLP

(57) ABSTRACT

An optical disk drive includes a disk-carrying tray, a shielding member and buffer member disposed at adjoining position of the disk-carrying tray and the shielding member to absorb impact of broken pieces in case of breakup of an optical disk during the reading and writing operations.

9 Claims, 4 Drawing Sheets

US 7,299,479 B2

OPTICAL RECORDING AND/OR REPRODUCING DEVICE WITH A BUFFER MEMBER

This Nonprovisional application claims priority under 35 U.S.C. § 119(a) on patent application Ser. No. 092120647 filed in TAIWAN, R.O.C. on Jul. 29, 2003, the entire contents of which are hereby incorporated by reference.

FIELD OF THE INVENTION

The invention relates to an optical disk drive, more particularly to an optical disk drive which includes a disk-carrying tray, a shielding member and a buffer member disposed at adjoining position of the disk-carrying tray and the shielding member so as to absorb impact of broken pieces of an optical disk that fly out due to outbreak of the optical disk under high rotation speed.

BACKGROUND OF THE INVENTION

Advance of personal computer consequently results in swift improvement in the peripheral accessories, such as a hard disk drive, a DVD player, a scanning machine, and a printing machine. The peripheral accessories are inevitable tools in an office. Since the cost of the peripheral accessories becomes cheaper day-by-day, they are widely used at homes not only in offices. An optical disk drive, such as a DVD player, is widely used since an optical disk is capable of storing a large amount of data permanently. The stored data may include music and movies that can be written in programs and are stored in the optical disk. The latest DVD disk (digital versatile disc) of 17 GB has a relatively large storage capacity and subsequently renders a wide use of the DVD player at home and offices.

In order to increase the reading efficiency of the device 10, the optical disk is arranged in such manner to rotate under high speed. The motor for running the optical disk of 40× rotates 8000 rotations per minute. Under such high speed, the centrifugal force resulting from rotation of the optical disk is relatively large. There is possibility of a breakup of the rotating disk under high rotation speed.

To lower the price of DVD disk, the manufacturing cost thereof must also be reduced. Some of the DVD disk manufacturers use recycled plastic in order to cut down the price of the DVD disk such that the quality of some of the DVC is subsequently affected and the service life and durability are consequently shortened. In some cases, interrupted tracks can be found on the inner portion of the recording surface of the optical disk. Such a DVD disk is susceptible to break under high rotation speed.

Imperfect production may cause the DVD disk to have a plurality of bubbles. Uneven coating on the recording surface of the DVD disk and improper utility of the DVD disk may cause the DVD disk to bend in one direction, which in turn, offset the gravity center away from an axis of the DVD disk. The DVD disk may vibrate in upward-and-downward direction under the high rotation speed. In case the DVD disk is produced from poor quality, a crack up or rupture of the DVD disk is possible.

Referring to FIG. 1, a conventional optical disk drive 10 (a DVD player) is installed in a personal computer 1 so as to perform reading of the optical disk, and includes a disk compartment, a disk-carrying tray 12 disposed within the disk compartment and extendible outwardly therefrom upon pressing of an on/off switch 10S that is formed on an outer face of the disk compartment. The disk-carrying tray 12 is formed with a recess to receive the optical disk 11 therein, and is retractable into the disk compartment upon pressing of the on/off switch 10S. A shielding member 14 is attached to a distal end of the disk-carrying tray 12 in such a manner that the shielding member 14 is flush with the outer face of the disk compartment so as to provide aesthetic effect and prevent dirt from getting thereinto when the disk-carrying tray retracts interior of the disk compartment.

Note that the disk-carrying tray 12 and the shielding member 14 are made from plastic material, and are not integrally formed together. The shielding member 14 is attached to the disk-carrying tray 12 via hook-and-loop engagement. In case there is cracking or breakup of the optical disk under high rotation speed, the disk-carrying tray 12 and the shielding member 14 are first to be collided by the broken pieces, which in turn, may result in disengagement of the shielding member 14 from the disk-carrying tray 12. The fly out broken pieces of the optical disk may injure a person standing nearby the device 10. FIG. 1 illustrates a state of cracking of the optical disk 11.

Referring to FIG. 2, to solve the aforesaid drawback, an elongated metal bar 16 is mounted rearwardly of the shielding member 14 in order to prevent impact of the broken pieces against the shielding member 14. Two fastener screws 18 extends through opposite ends of the metal bar 16, are fastened to the lateral side walls 17 of the disk compartment. Under such arrangement, the metal bar 16 can prevent the dispersion of the broken pieces. However, damage to the reading or/and writing head may result since the head can be collided by the broken pieces, which rebound from the metal bar 16. In addition, boring of two holes in the lateral sidewalls 17 of the disk compartment for mounting of the metal bar 16 causes a large manufacture expense of the device 10.

SUMMARY OF THE INVENTION

The object of the present invention is to provide an optical disk drive that has a buffer member disposed at adjoining position of a disk-carrying tray and a shielding member so as to prevent and absorb the impact of broken pieces resulting from cracking of the optical disk under the high rotation speed during the reading operation.

According to the present invention, an optical disk drive is provided to include: a disk compartment having an entrance-and-exit opening; a disk-carrying tray mounted within an interior of the disk compartment, and defining a disk-receiving recess therein, the disk carrying tray being movable between an opening position, in which the disk-carrying tray is exposed from the disk compartment via the opening so as to permit placing of the optical disk on the disk-receiving recess in the disk-carrying tray, and a closing position, in which the disk-carrying tray is withdrawn into the disk compartment to permit reading and writing of the optical disk; a shielding member attached to the disk-carrying tray in such a manner that the shielding member covers the opening and flushes with an outer surface of the disk compartment when the disk-carrying tray is disposed at the closing position; and a buffer member mounted on the disk-carrying tray, disposed rearwardly of the shielding member in such a manner that the buffer member blocks the opening in the disk compartment so as to stop and absorb impact of broken pieces in case a breakup of the optical disk occurs when the disk-carrying tray is disposed at the closing position.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the following detailed description and the accompanying drawings, which are given by way or illustration only, and thus are not limitative of the present invention, and in which.

DETAILED DESCCRIPTIONS OF THE PREFERRED EMBODIMENT

Figure 1:
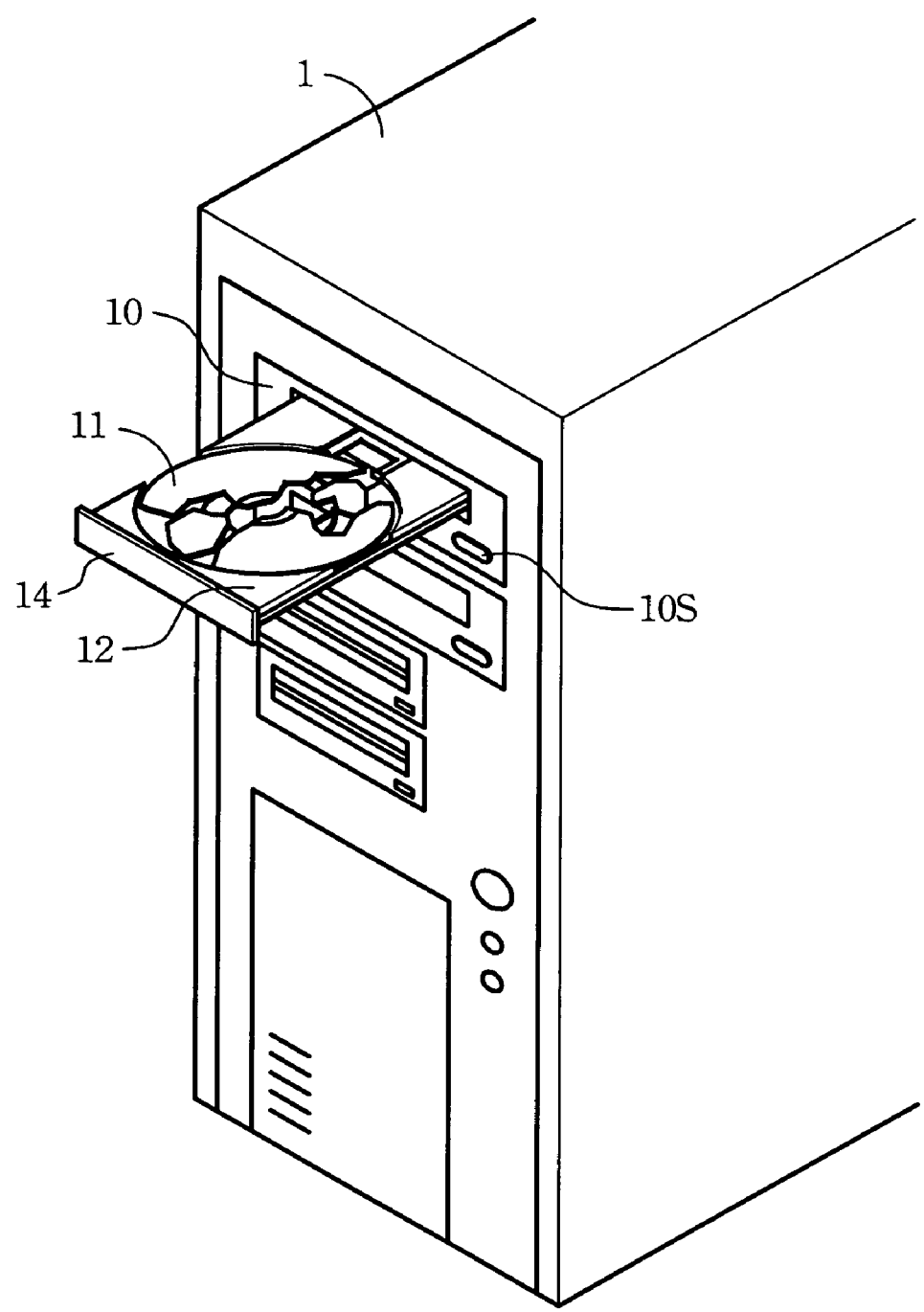
FIG. 1 shows a perspective view a conventional disk recording and/or reproducing device installed in a CPU of a personal computer.
Figure 3:
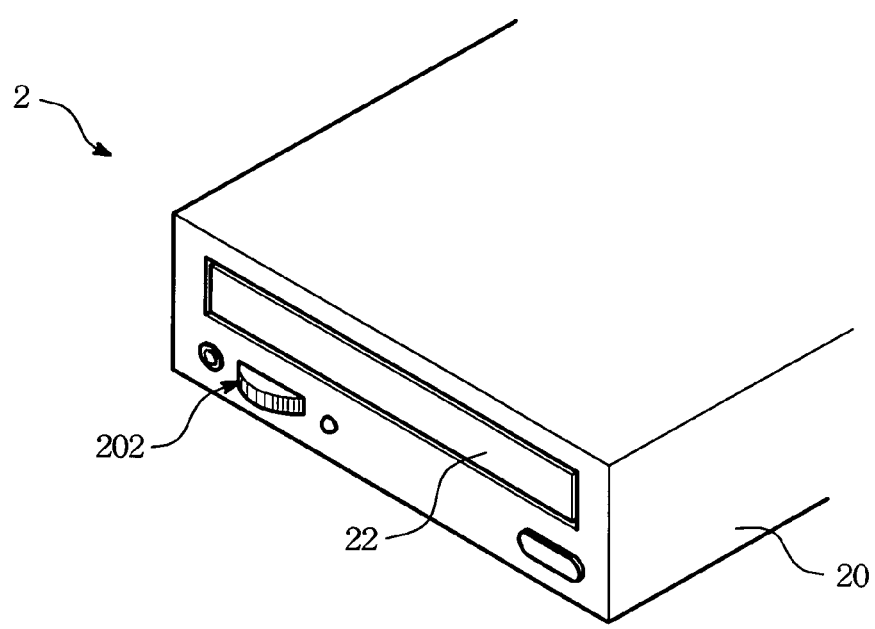
FIG. 3 is a perspective fragmentary view of the preferred embodiment of an optical disk recording and/or reproducing device according to the present invention.
Figure 4:
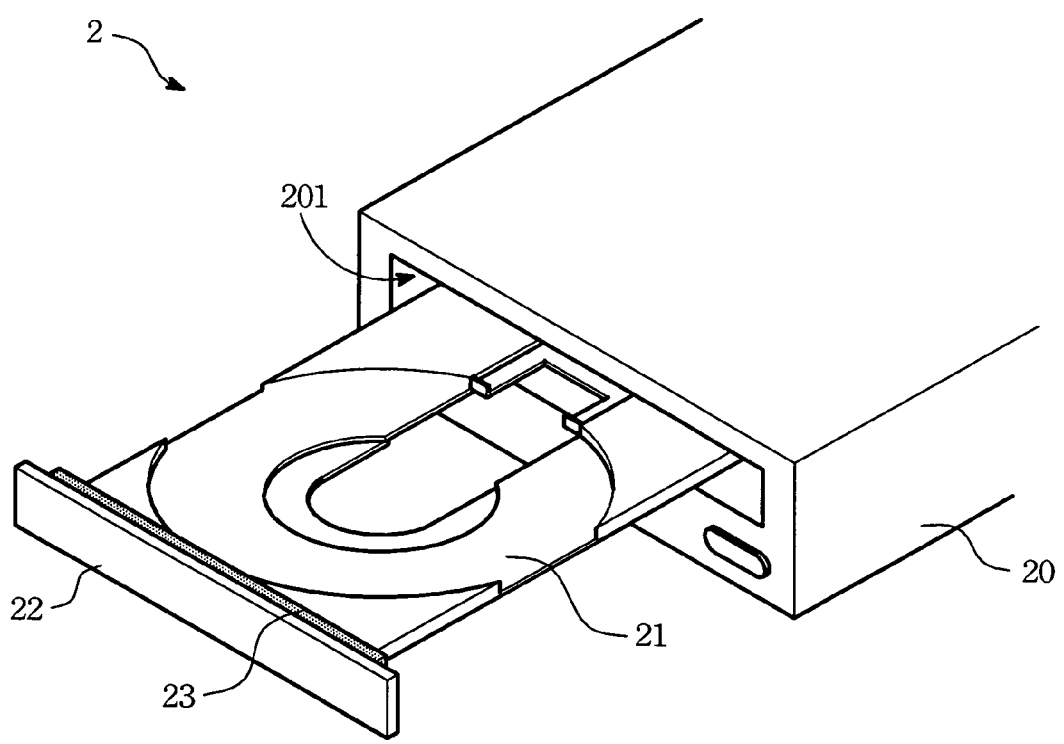
FIG. 4 is a fragmentary view, illustrating a disk-carrying tray of the preferred embodiment at an opening position.

Referring to FIG. 3, a fragmentary perspective view of the preferred embodiment of an optical disk drive 2 according to the present invention is shown and is generally installed in a personal computer (see FIG. 1).

Figure 2:
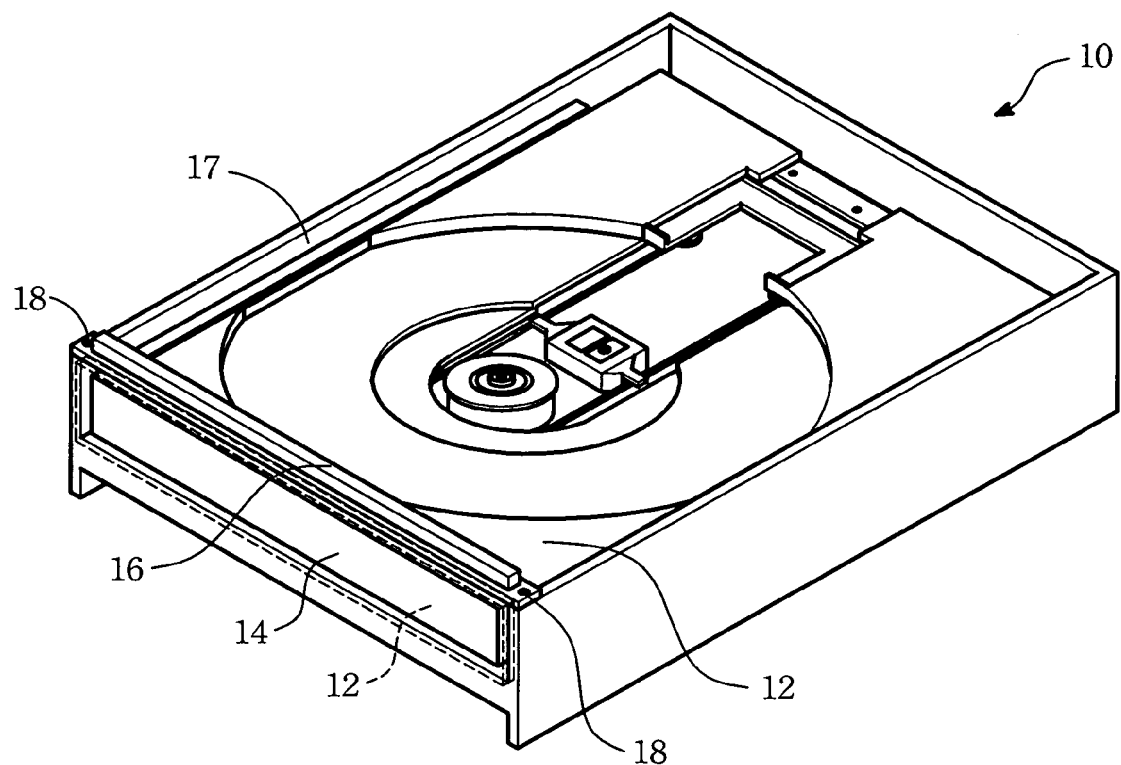
FIG. 2 is an enlarged perspective view, illustrating an interior of the conventional disk recording and/or reproducing device.

Referring to FIG. 2, the device 2 includes a disk compartment 20, a disk-carrying tray 21, a tray driving mechanism (not visible), a shielding member 22, and a buffer member 23. The disk compartment 20 has opposite front and rear sides, and an entrance-and-exit opening 201 at the front end thereof. The disk-carrying tray 21 is mounted within an interior of the disk compartment 20, and defines a disk-receiving recess therein. The structure of the tray driving mechanism is not the relevant feature of the present invention, a detailed description thereof is omitted herein for the sake of brevity.

An on/off switch 202 is mounted on the disk compartment 20 below the opening 201. The disk compartment 20 is further formed with a plurality of switches, such as volume adjusting switch, power indicating light, socket holes to receive microphone cable and etc. The disk-carrying tray 21 is movable upon pressing of the on/off switch 202 between an opening position of FIG. 2, in which the disk-carrying tray 21 is exposed from the disk compartment 20 via the opening 201 so as to permit placing of the optical disk (DVD) on the disk-receiving recess in the disk-carrying tray 21, and a closing position, in which the disk-carrying tray 21 is withdrawn into the disk compartment 20 to permit reading and writing operation of the disk.

The shielding member 22 is attached to the disk-carrying tray 21 in such a manner that the shielding member 22 covers the opening 201 and flushes with an outer surface of the disk compartment 20 when the disk-carrying tray 21 is withdrawn into the disk compartment, thereby disposing the same at the closing position, where reading or writing operation of the disk can be conducted.

The buffer member 23 is mounted adhesively on an inner surface of the shielding member 22 in such a manner that the buffer member 23 blocks the opening 201 so as to stop and absorb impact of broken pieces in case there is a breakup of the disk 24 when the disk-carrying tray 21 is disposed at the closing position.

Figure 5:
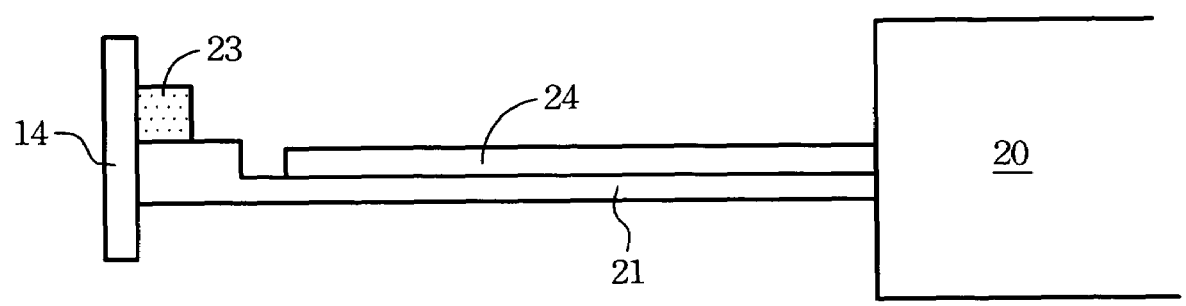
FIG. 5 is a lateral side view of the disk-carrying tray of the preferred embodiment shown in FIG. 5.

In this preferred embodiment, the buffer member 23 extends along the width of the opening 201 (see FIG. 5) such that when there is a crack in the disk during the reading or writing operation, the impact force of broken pieces that fly out under high velocity is absorb by the buffer member 23. Under this condition, in case the reading and/or writing head of the device 2 is collided by the broken pieces, the head is not damaged because the force of the broken pieces that rebound from the buffer member is greatly reduced. Preferably, the buffer member 23 is made from elastomeric material, such as silicon rubber, latex, foam, and MYLAR, and has a plate-like configuration with a thickness ranging from 0.5 mm to 5.0 mm.

Since provision of the buffer member 23 blocks the opening 201 in the disk compartment 20, the broken pieces of the disk are confined within the disk compartment 20 in case cracking of the disk occurs during the reading and writing operation. The object of the invention is accordingly achieved.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An optical disk drive capable of preventing occurrence of breakup of an optical disk therewithin, the device comprising:

a disk compartment having an entrance-and-exit opening;

a disk-carrying tray mounted within an interior of said disk compartment, said disk carrying tray being movable between an opening position and a closing position, in which said disk-carrying tray is withdrawn into said disk compartment to permit reading and writing of the optical disk;

a shielding member attached to said disk-carrying tray in such a manner that said shielding member covers said opening and flushes with an outer surface of said disk compartment when said disk-carrying tray is disposed at said closing position; and a buffer member mounted on said disk-carrying tray, disposed rearwardly of said shielding member in such a manner that said buffer member blocks said opening so as to stop and absorb impact of broken pieces in case a breakup of the optical disk occurs when said disk-carrying tray is disposed at said closing position.

2. The optical disk drive according to claim 1, wherein said buffer member is attached adhesively on an inner surface of said shielding member.

3. The optical disk drive according to claim 1, wherein said buffer member is made from an elastomeric material.

4. The optical disk drive according to claim 1, wherein said buffer member has a thickness ranging from 0.5 mm to 5.0 mm.

5. An optical disk drive capable of preventing occurrence of breakup of an optical disk therewithin, the device comprising:

a disk-carrying tray for carrying the optical disk thereon;

an entrance-and-exit opening via which said disk-carrying tray is exposed and withdrawn;

a shielding member attached to said disk-carrying tray in such a manner that said shielding member covers said opening when said disk-carrying tray is withdrawn into the device; and a buffer member having a plate-like configuration and mounted at adjoining position between said disk-carrying tray and said shielding member, wherein said buffer member is adapted to absorb impact of the broken pieces which fly out due to breakup of the optical disk.

6. The optical disk drive according to claim 5, wherein said buffer member is adapted to absorb impact and abrasion of the broken pieces which fly out due to breakup of the optical disk during reading and/or writing operations.

7. The optical disk drive according to claim 5, wherein said buffer member is mounted adhesively on said shielding member.

8. The optical disk drive according to claim 5, wherein is made from an elastomeric material.

9. The optical disk drive according to claim 5, wherein said buffer member has a thickness ranging from 0.5 mm to 5.0 mm.

* * * * *